J. S. SHAW.
FURNACE FOR MELTING GLASS AND OTHER PURPOSES.
APPLICATION FILED MAY 4, 1920.

1,359,756.

Patented Nov. 23, 1920.
4 SHEETS—SHEET 1.

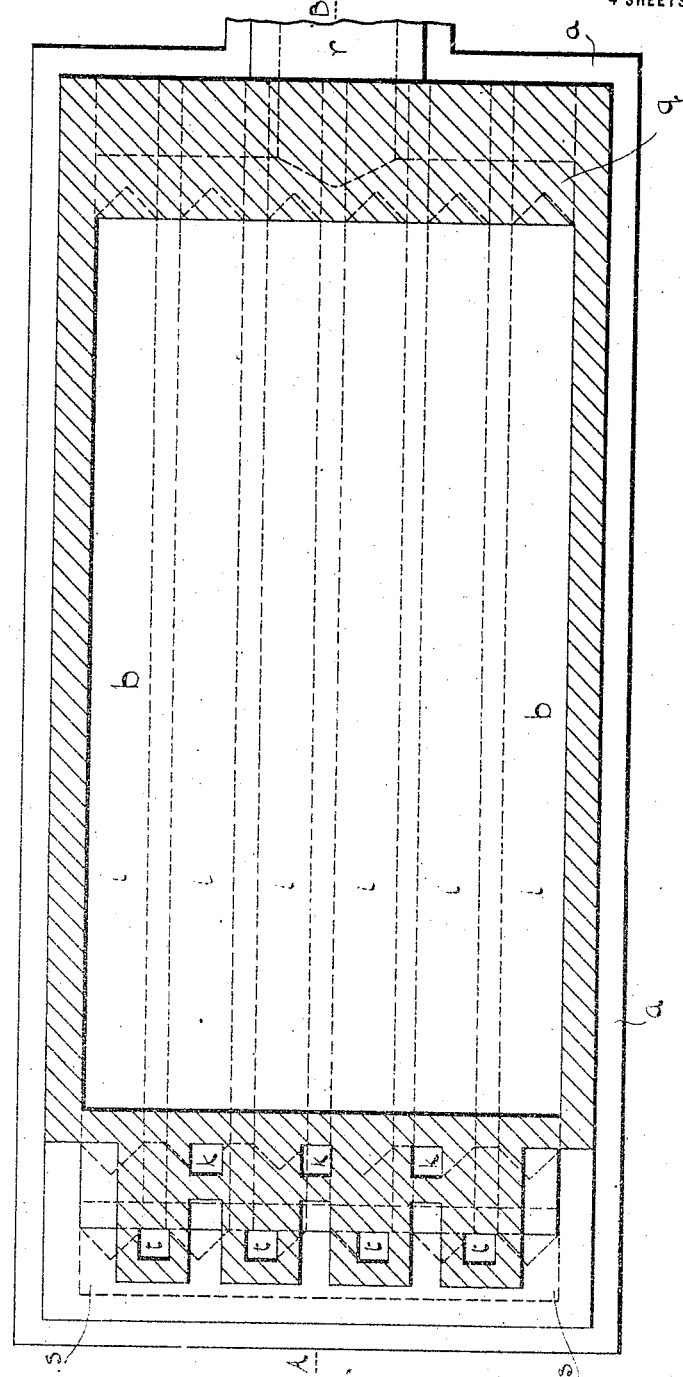

J. S. SHAW.
FURNACE FOR MELTING GLASS AND OTHER PURPOSES.
APPLICATION FILED MAY 4, 1920.

J. S. SHAW.
FURNACE FOR MELTING GLASS AND OTHER PURPOSES.
APPLICATION FILED MAY 4, 1920.
1,359,756.
Patented Nov. 23, 1920.
4 SHEETS—SHEET 4.
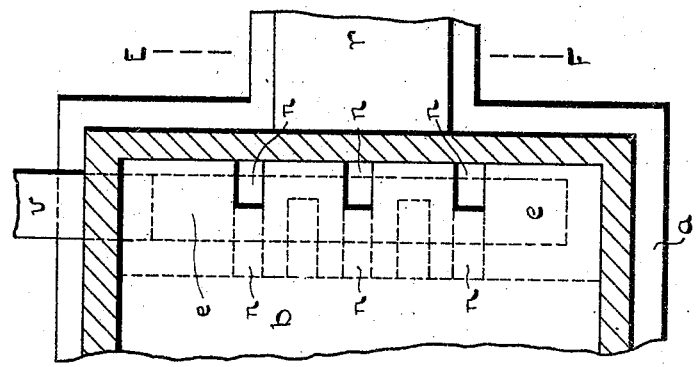
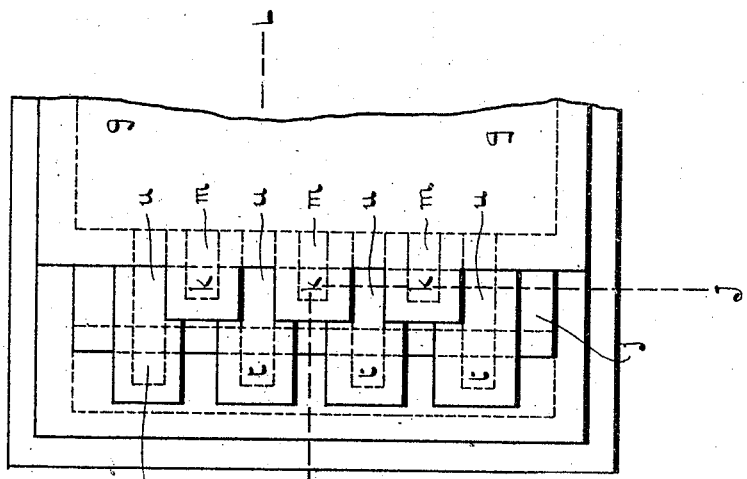
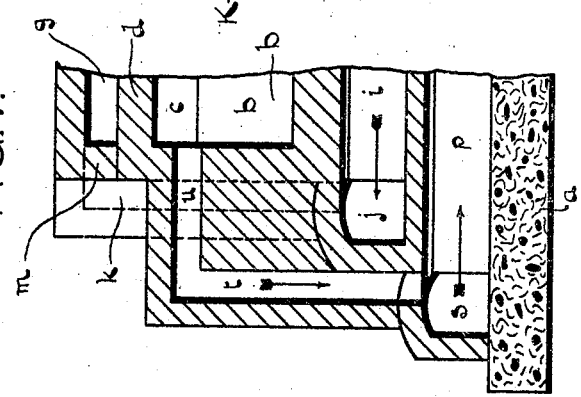

UNITED STATES PATENT OFFICE.

JOHN SCHOFIELD SHAW, OF POOL, NEAR LEEDS, ENGLAND.

FURNACE FOR MELTING GLASS AND OTHER PURPOSES.

1,359,756.         Specification of Letters Patent.    Patented Nov. 23, 1920.

Application filed May 4, 1920. Serial No. 378,853.

*To all whom it may concern:*

Be it known that I, JOHN SCHOFIELD SHAW, residing at Furze Hill, Pool Bank, Pool, near Leeds, in the county of York, England, have invented new and useful Improvements in or Relating to Furnaces for Melting Glass and other Purposes, of which the following is a specification.

This invention has reference to improvements in furnaces employed for melting glass and other purposes.

The object of this invention is to provide a furnace in which a regenerative or recuperative furnace for heating the air for combustion purposes is dispensed with, and in which the air admitted to the interior of the furnace is more efficiently heated during its passage through the several flues, uptakes and passages to the combustion chamber, separate flues being employed for returning the waste gases to the front end of the furnace. An important feature of this invention is the arrangement of the said flues, uptakes, and passages for the admission of air and the removal of the waste gases, a double series of flues being employed, portions of which are arranged below the bath or tank in which the glass or other metal is melted; the air admission flues being interposed between the bottom of the bath or tank and the series of waste gas flues. The air and waste gases are arranged to pass through the said flues in opposite directions.

According to this invention the furnace is built as hitherto on a concrete foundation and of fire-bricks or other refractory materials and in the usual manner and shape.

In the furnace is built or formed as usual the bath or tank or other receptacle for receiving the glass or other metal to be melted, the bottom of the bath or tank being formed in the usual manner. Below the bottom of the bath or tank are arranged a number of longitudinal and parallel flues or passages for the admission of air. The said flues or passages are open at their front or right hand ends and communicate at their rear or left hand ends with a transverse flue or passage. A number, say, three or more, vertical flues or uptakes connect the transverse flue with a corresponding number of horizontal openings leading into a shallow longitudinal flue or passage arranged above the bath or tank and under the crown of the furnace. The front (right hand) end of the said shallow flue is arranged to communicate with the combustion chamber in such a manner that the gases from a gas chamber pass through one or more short flues and mix with the heated air as it enters the combustion chamber. The waste gases or products of combustion escape from the rear (left hand) end of the said tank or bath through a number, say, four or more, horizontal openings, and vertical flues or passages, the lower ends of which communicate with a second transverse flue or passage at the rear end of the furnace. A third transverse flue is provided near to the front end of the furnace and the second and third transverse flues are connected together by a number, say, six, more or less, longitudinal and parallel flues or passages. The third transverse flue or passage is connected by a flue or passage to the chimney or stack. The second and third transverse flues, their connecting longitudinal flues or passages and the flue or passage to the chimney are all arranged on a lower level than the air inlet flues or passages and the first named transverse flue or passage, portions of the air inlet and the waste gas flues, and their transverse flue being below the bath or tank and so arranged that the air and waste gases travel in opposite directions.

In the above arrangement of flue in the furnace the air admitted into the flue between the bottom of the bath and the waste gas flue mingles with the gas from the gas chamber after the air has been delivered into the combustion chamber and during its passage through the flue becomes heated by contact with the heat from the bottom of the bath. The air and waste gases travel in opposite directions.

In the accompanying drawings is shown a means for carrying the invention into practice, in which—

Fig. 2 is a sectional plan on line C, D, Fig. 1;

Fig. 4 is a part sectional plan of the front end of the furnace on line G, H, Fig. 3;

Fig. 5 is a part plan looking at the top of the rear end of the furnace;

Fig. 7 is a part sectional elevation of the rear end of the furnace on line K, L, Fig. 5.

Like parts in all the views are marked with similar letters of reference.

Figure 1:
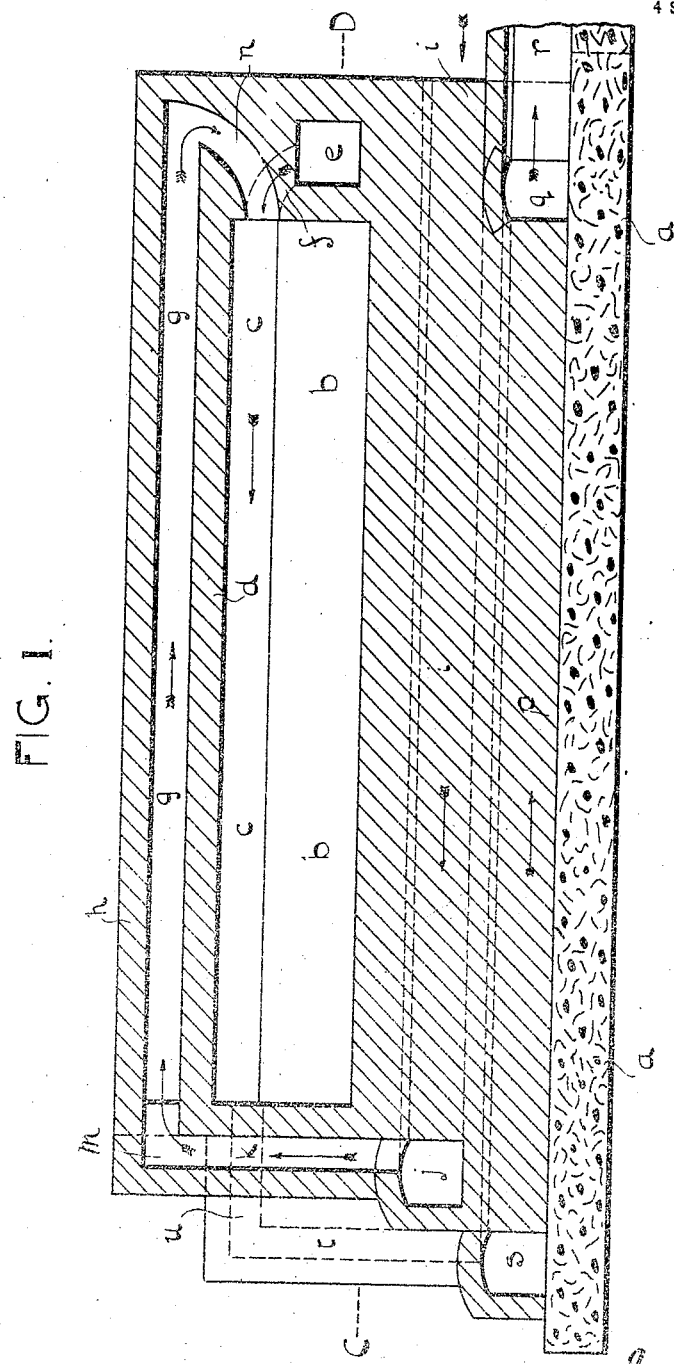
Figure 1 is a sectional elevation of a glass melting furnace on line A, B, Fig. 2.
Figure 3:
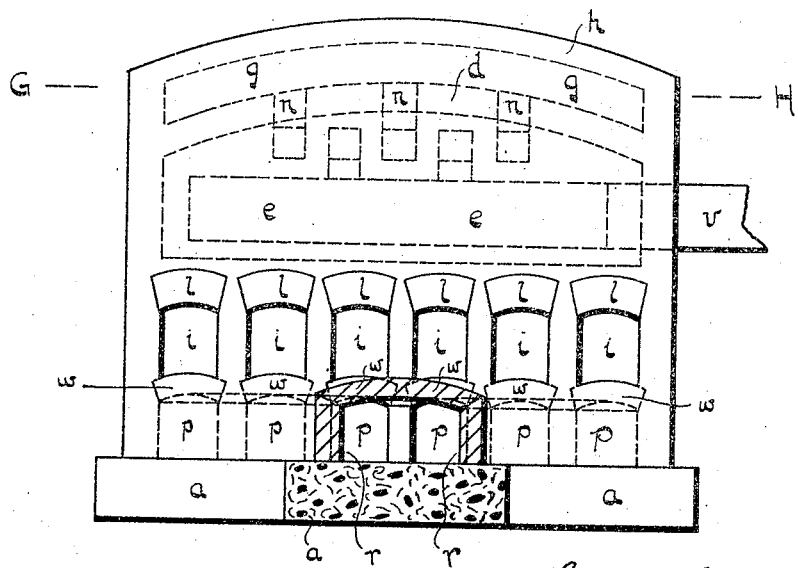
Fig. 3 is a part elevation and a part section on line E, F, Fig. 4.

The furnace is built upon a concrete foundation $a$ and of fire-bricks or other refractory material in the usual manner and shape. In the furnace is built a bath or tank or other receptacle,—hereinafter termed the "bath $b$,"—for receiving the glass or other material to be melted. The bottom of the bath $b$ is formed in the usual manner. The space $c$ forms the flue or combustion chamber between the top of the bath $b$ and crown $d$. The space $c$ also acts as a flue for the combined air and gas which passes over the bath $b$. The gas passes from chamber $e$ to the flue or combustion chamber $c$ through one or more flues $f$ and the gas from the chamber $e$ mingles with the heated air from flue $g$. A second space $g$ with a crown $h$ is formed above the bath $b$. The space or flue $g$ is in communication with the cold air that is admitted to the furnace. Below the bath are arranged a series of flues $i$ say six, more or less, for the admission of air. The flues $i$ communicate at their rear end with a transverse flue $j$ arranged at the rear end of the furnace. The flue $j$ extends the width of the bath $b$ and a communication is made between the flues $j$ and $g$ by a number of vertical uptakes or flues $k$ and horizontal openings $m$. Three flues $k$ are shown at Fig. 5 which communicate with the transverse flue $j$, and at Fig. 3 are shown six air inlet flues $i$ which communicate at their inner ends with the said transverse flue $j$, but the said numbers are varied as circumstances require. At the front end of the furnace the inlet flues $i$ are open to the air, as shown at Fig. 1. The inlet air flues $i$ are longitudinal and parallel with each other, and are arranged immediately below the bottom of the bath $b$. Instead of making them with one crown they are provided with a series of arches $l$, as shown at Fig. 3. The air flue $g$ extends the full length of the furnace and at its rear end it is in communication with the vertical flues $k$ by means of a number of horizontal flues or openings $m$. At the front end of the flue $g$ there are three curved pendant openings $n$ whereby the air admitted through the flues $i$, $j$, $k$, $m$, $n$, $g$ mingles with the gas from chamber $e$ which passes through the passages $f$, $f$, prior to entering into the combustion chamber $c$ above the bath $b$.

On reference to Fig. 3 it will be seen that the brickwork $d$ and $h$ respectively on the top of the flue or combustion chamber $c$ and above the air flue $g$ form two crowns, the crown $d$ forming a division between the combustion chamber $e$ and the air flue $g$.

Figure 6:
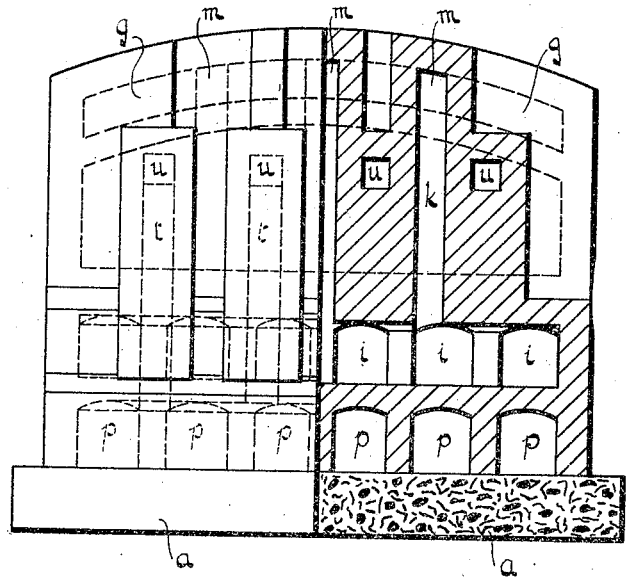
Fig. 6 is a part end elevation of a section on line I, J, Fig. 5 of the rear end of the furnace.

Below the air inlet flues $i$ are arranged a number or series of flues $p$ which extend nearly the full length of the furnace, as shown at Figs. 3 and 6, the front ends of which communicate with a single transverse chamber $q$,—Figs. 1 and 2,—at a suitable distance from the front of the furnace. The transverse chamber $q$ is in communication with a flue $r$ which conveys the waste gases to the chimney. At the opposite or rear end of the furnace is a second transverse flue $s$ extending the full width of the bath. The combustion chamber $c$ and the transverse chamber $s$ are connected together by means of a number of vertical flues $t$ and transverse flues or openings $u$, the inner ends of the latter opening into the combustion chamber $c$ as shown at Fig. 7.

By arranging the air admission flues $i$ and the waste gas flues $p$ and $q$ below the bath or tank $b$ the air passing through the flues $i$ is heated by the heat radiating from the bottom of the tank or bath and from the tops of the flues $p$.

On reference to Figs. 3, 5, and 6 of the drawings it will be seen that there are six longitudinal waste gas flues $p$ communicating with the transverse chambers $s$ and $q$, and that there are four vertical flues $t$ and transverse flues $u$ communicating with the combustion chamber $c$ and one main outlet $r$ to the chimney, the latter not being shown in the drawings. By the means described the waste gases passing from the combustion chamber $c$ travel in an opposite direction to the cold air, and they are retained in the flues $p$ for a longer time than they would hitherto be if they passed directly to the chimney and so are employed for heating the cold air as it passes through the longitudinal flues $i$ to the transverse chamber $j$, and from thence up the three vertical flues $k$,—at the rear end of the furnace,—and the short horizontal flues or openings $m$ to the air flue $g$ which is arranged above the combustion chamber $c$.

Cold air is admitted at the front end of the furnace into the longitudinal flues $i$ and from thence it passes into the transverse flues $j$ up the vertical flues $k$, through openings or short flues $m$ into the air flue $g$,—which extends the full width of the combustion chamber $c$ and bath $b$,—and from thence passes down the curved flues $n$ at the front end of the furnace where it mingles with the gases that pass from the chamber $e$, through flue or flues $f$ and enter the combustion chamber $c$. The heated air and gases pass over the top of the metal in the bath and after passing over the same for melting the metal the waste gases pass out through the horizontal flues $u$ down the vertical flues $t$ into the transverse chamber $s$,—at the rear end of the furnace,—and from thence are conveyed through the longitudinal flues $p$ into the transverse chamber $q$ into the flue $r$ by which the waste products of combustion are conveyed to the chimney. By interposing the cold air longitudinal flues $i$ between the bottom of the bath $b$ and the top of the waste gas flues the heat therefrom is employed for heating the air as it passes through the flues $i$, $k$, $m$ into $g$ where, during its passage through this latter flue, it is further heated by the heat from the combustion chamber $c$, thus producing an economy in gas for melting purposes and a greater efficiency of the furnace.

Gas is supplied to the chamber $e$,—which is arranged to extend nearly the full width of the bath,—from a gas producer or other source of supply through the flue $v$.

It will be seen on reference to Figs. 3 and 6 of the drawings that the longitudinal flues $i$ and $p$ are arranged immediately one above the other and are provided with supporting arches $l$ and $w$.

Other parts of the furnace not explained or referred to are of the usual and ordinary construction.

What I claim is:—

1. A furnace for melting glass and other materials in which a regenerator for heating the air is dispensed with, a bath for receiving the material to be melted arranged in the interior of the furnace and having a combustion chamber above it, two sets of longitudinal flues arranged on different levels below the bath and one air flue longitudinally arranged above the bath, one of the lower sets of flues being employed for the admission and heating of the cold air by the radiation of the heat from the bottom of the bath during its passage from the outside of the furnace to the combustion chamber, the other set of flues being employed for conveying the waste gases and products of combustion from the rear end of the combustion chamber, the incoming air and the waste gases being arranged to travel in opposite directions, two sets of vertical flues at the rear of the furnace for respectively connecting the lower air inlet flues with the upper longitudinal flue, and with the rear of the furnace, a number of passages for connecting the upper longitudinal flue to the combustion chamber, and a gas chamber connected by a number of passages to the combustion chamber for conveying the gas to the said chamber for combustion purposes, as set forth.

2. In a furnace for melting glass and other materials, the combination of the bath within the furnace which receives the material to be melted, a combustion chamber above the bath, a plurality of horizontal flues below the bath on different levels, a plurality of vertical flues at the rear of the bath, a transverse chamber interposed between the horizontal and vertical portions of said flues employed for the admission and heating of the cold air, passages at the rear of the bath for connecting the vertical portions of the flues to a longitudinal air chamber over the bath, and passages at its opposite end to the combustion chamber, a gas chamber connected by passages to the combustion chamber, a second plurality of vertical and horizontal flues, and transverse chambers arranged at the rear of and under the bath but on and in a different position and level to the first named set for conveying the waste gases and products of combustion away from the rear of the combustion chamber to the chimney, as set forth.

3. In a furnace for melting glass and other material, the combination of two series of longitudinal flues arranged on different levels below the bottom of the bath of the furnace, a combustion chamber above the bath, one series of the above named flues being for the admission and heating of the air, and the other series for conveying the waste gases and products of combustion away, the latter series being below the air admission flues, a number of transverse chambers arranged at or near the front and the rear ends of the furnace, one of said chambers being connected by vertical and horizontal flues with the combustion chamber for conveying the products of combustion away from the latter chamber in an opposite direction to that in which the cold air travels, and the heat from the waste gases is utilized for heating the cold air during its passage into and through the furnace as set forth.

JOHN SCHOFIELD SHAW.

Witnesses:
W. FAIRBURN HART,
ALICE MARY TURNER